(12) United States Patent
Edmunds (10) Patent No.: US 10,250,183 B2
(45) Date of Patent: Apr. 2, 2019

(54) MODULAR SOLAR POWER GENERATOR

(71) Applicant: Joseph O. Edmunds, Manhattan, KS (US)

(72) Inventor: Joseph O. Edmunds, Manhattan, KS (US)

( * ) Notice: Subject to any disclaimer, the term of this patent is extended or adjusted under 35 U.S.C. 154(b) by 500 days.

(21) Appl. No.: 14/519,612

(22) Filed: Oct. 21, 2014

(65) Prior Publication Data

US 2015/0115869 A1  Apr. 30, 2015

Related U.S. Application Data

(60) Provisional application No. 61/895,814, filed on Oct. 25, 2013.

(51) Int. Cl.
| | |
|---|---|
| *H02J 7/35* | (2006.01) |
| *F24S 25/00* | (2018.01) |
| *F24S 25/10* | (2018.01) |
| *F24S 25/60* | (2018.01) |
| *H02S 20/00* | (2014.01) |
| *H02S 30/10* | (2014.01) |
| *H02S 40/38* | (2014.01) |

(52) U.S. Cl.
CPC ............. *H02S 30/10* (2014.12); *F24S 25/10* (2018.05); *H02S 20/00* (2013.01); *H02S 40/38* (2014.12); *F24S 2025/013* (2018.05); *F24S 2025/6002* (2018.05); *H02J 7/35* (2013.01); *Y02E 10/47* (2013.01); *Y02E 10/50* (2013.01); *Y02E 10/566* (2013.01)

(58) Field of Classification Search
CPC .................................. H02S 30/10; H02S 20/10
USPC ........................................................... 136/244
See application file for complete search history.

(56) References Cited

U.S. PATENT DOCUMENTS

| | | | | |
|---|---|---|---|---|
| 6,414,237 | B1 * | 7/2002 | Boer | F24J 2/5205 |
| | | | | 126/623 |
| 7,487,771 | B1 * | 2/2009 | Eiffert | F24J 2/5211 |
| | | | | 126/621 |
| 2006/0197351 | A1 * | 9/2006 | Bastian | B60P 1/003 |
| | | | | 296/26.09 |
| 2008/0230047 | A1 * | 9/2008 | Shugar | F24J 2/525 |
| | | | | 126/569 |
| 2009/0078299 | A1 * | 3/2009 | Cinnamon | F24J 2/5211 |
| | | | | 136/244 |

(Continued)

*Primary Examiner* — David V Henze-Gongola
*Assistant Examiner* — Tarikh Kanem Rankine
(74) *Attorney, Agent, or Firm* — Erickson Kernell IP, LLC; Aaron S. Reed (57) ABSTRACT

A portable, modular solar array. The array includes a support structure configured to support a plurality of solar panel modules in a side-by-side co-planar arrangement. The support structure can be configured to support the modules in an elevated position to provide an overhead structure that shades an underlying area. The solar panel modules include solar panels mounted on a frame in a planar configuration. The frame includes a pair of hooked mounting flanges at a first end and a pair of slotted mounting flanges at a second end that enable mounting of the module between opposing support bars of the support structure. The modules are in electrical communication with a battery for storage of electrical energy generated by the solar panels. The frames and the mounting flanges are further configured to enable stacking of a plurality of the modules for storage or transport.

22 Claims, 7 Drawing Sheets

(56) References Cited

U.S. PATENT DOCUMENTS

| | | | | |
|---|---|---|---|---|
| 2009/0320907 | A1* | 12/2009 | Botkin | F24J 2/5211 |
| | | | | 136/251 |
| 2010/0147362 | A1* | 6/2010 | King | F24J 2/4614 |
| | | | | 136/251 |
| 2010/0219304 | A1* | 9/2010 | Miros | F24J 2/5205 |
| | | | | 248/125.8 |
| 2011/0049992 | A1* | 3/2011 | Sant'Anselmo | F03D 1/005 |
| | | | | 307/64 |
| 2011/0132427 | A1* | 6/2011 | Kalkanoglu | H01L 31/0482 |
| | | | | 136/244 |
| 2012/0024350 | A1* | 2/2012 | Chan | H02S 30/10 |
| | | | | 136/251 |
| 2012/0085394 | A1* | 4/2012 | McPheeters | H02S 20/20 |
| | | | | 136/251 |
| 2013/0269181 | A1* | 10/2013 | McBride | H02S 40/00 |
| | | | | 29/825 |
| 2013/0342155 | A1* | 12/2013 | Neel | H01L 31/0422 |
| | | | | 320/101 |

* cited by examiner

MODULAR SOLAR POWER GENERATOR

CROSS-REFERENCE TO RELATED APPLICATIONS

This application claims the benefit of U.S. Provisional Patent Application No. 61/895,814 filed Oct. 25, 2013 and titled MODULAR SOLAR POWER GENERATOR, the disclosure of which is hereby incorporated herein in its entirety by reference.

BACKGROUND

When setting up temporary structures in remote locations or locations that are not near existing buildings and infrastructure, connections to a public power grid may not be readily available. Typically gas powered generators are transported to such locations to generate electricity. These generators can be noisy, expensive, and generate unwanted exhaust gases. Alternatively, a temporary power drop and meter may be installed by a local electrical company. This too can be can be prohibitively expensive as well as time consuming and requires trained installers.

There exists a need for a portable, environmentally-friendly electricity generator that can be easily transported to and assembled at any desired location without need for trained installers and without incurring expenses involved with installation of power meters or fuel.

SUMMARY

Embodiments of the invention are defined by the claims below, not this summary. A high-level overview of various aspects of the invention is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes, among other things, a portable, modular solar panel array.

The solar panel array includes a plurality of solar panel modules, a support structure, and power pack that stores electricity generated by the solar panels and supplies the stored electricity to electrical devices coupled thereto. The solar panel modules each comprise a generally rectangular frame with one or more solar panels mounted centrally thereon. A pair of slotted flanges is provided at a first end of the frame and a pair of hooked flanges is provided at an opposite second end. The slotted and hooked flanges are oriented generally perpendicular to the frame and are configured to enable vertical stacking of a plurality of the solar panel modules by abutting the frame of vertically adjacent stacked solar panel modules. The frames of vertically stacked solar panel modules might also be at least partially nestable.

The support structure provides a pair of parallel, spaced apart longitudinal supports that may be elevated overhead. The longitudinal supports are appropriately spaced for mounting of the solar panel modules therebetween by engaging the hooked flanges with a first of the longitudinal supports and engaging the slotted flanges with a second of the longitudinal supports. The solar panel modules are disposed side-by-side along the length of the first and second longitudinal supports and may provide an overhead, roof-like structure.

DESCRIPTION OF THE DRAWINGS

Illustrative embodiments of the invention are described in detail below with reference to the attached drawing figures, and wherein.

DETAILED DESCRIPTION

The subject matter of select embodiments of the invention is described with specificity herein to meet statutory requirements. But the description itself is not intended to necessarily limit the scope of embodiments of the invention. Rather, the subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. Terms or relativity, such as bottom, top, left, right, over, under, and the like are used with reference to the orientation of embodiments of the invention depicted in the drawings and are not intended to limit embodiments to a particular orientation.

Figure 1:
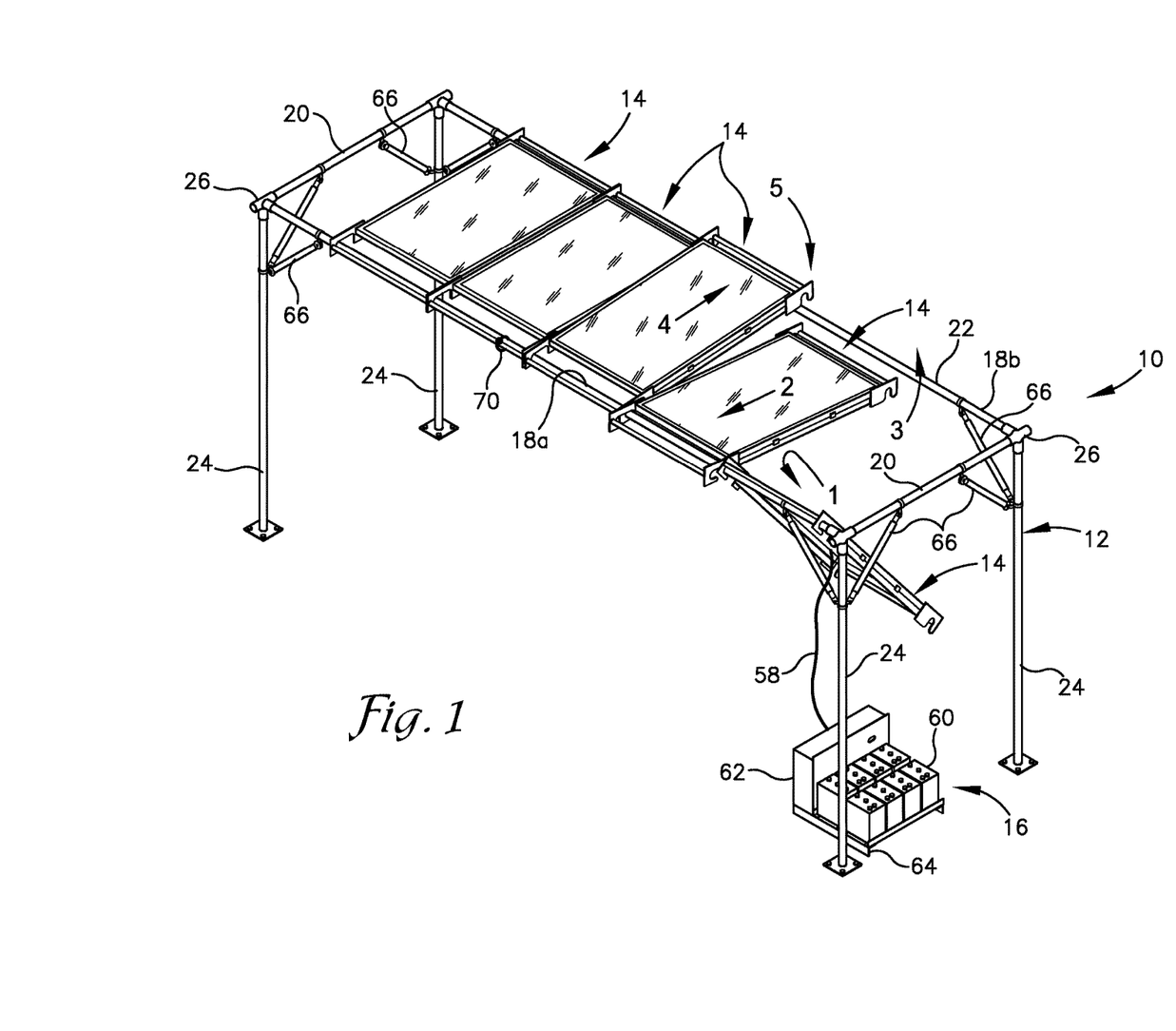
FIG. 1 is a perspective view of a portable, modular solar array depicted in accordance with an embodiment of the invention.

With initial reference to FIG. 1, a portable, modular solar array 10 is described in accordance with an embodiment of the invention. The solar array 10 includes a support structure 12, a plurality of solar panel modules 14, and a power pack 16. The support structure 12 includes a pair of longitudinal supports 18a, 18b and a pair of cross-members 20 coupled at their respective ends to form a generally rectangular frame 22. A leg 24 is disposed at each of the junctions between the longitudinal supports 18a, 18b and the cross-members 20 to support the frame 22 in an elevated position, such as an overhead position. One or more additional legs 24 may be disposed along the frame 22 to provide additional support or the legs 24 might be otherwise positioned as desired. Alternatively, the frame 22 may be suspended, cantilevered, or otherwise coupled to another structure (not shown) and supported thereby in lieu of the legs 24. A foot or flange is disposed at a distal end of each leg 24 to enable anchoring of the leg 24 to an underlying surface.

Coupling of the components of the support structure 12 may employ one or more fittings or fixtures 26 that provide proper orientation of the components with respect to one another. Any desired fasteners may be employed to couple the support structure components together or to their respective fixtures 26. The coupling of the components of the support structure 12 is configured for ease of assembly and disassembly such that the structure 12 may be erected and taken down as desired. In a disassembled state, the support structure 12 is configured for ease of storage and/or transportation, such as on a pallet or in a crate or bag.

The members of the support structure 12 are preferably rigid tubular members such as steel or aluminum tubing, but may comprise other forms or materials without departing from the scope of embodiments of the invention described herein. In one embodiment, the support structure 12 is a SUNSTOPPER structure provided by Poly-Tex Inc. of Castle Rock, Minn. that may be modified to receive the solar panel modules 14.

Figure 2:
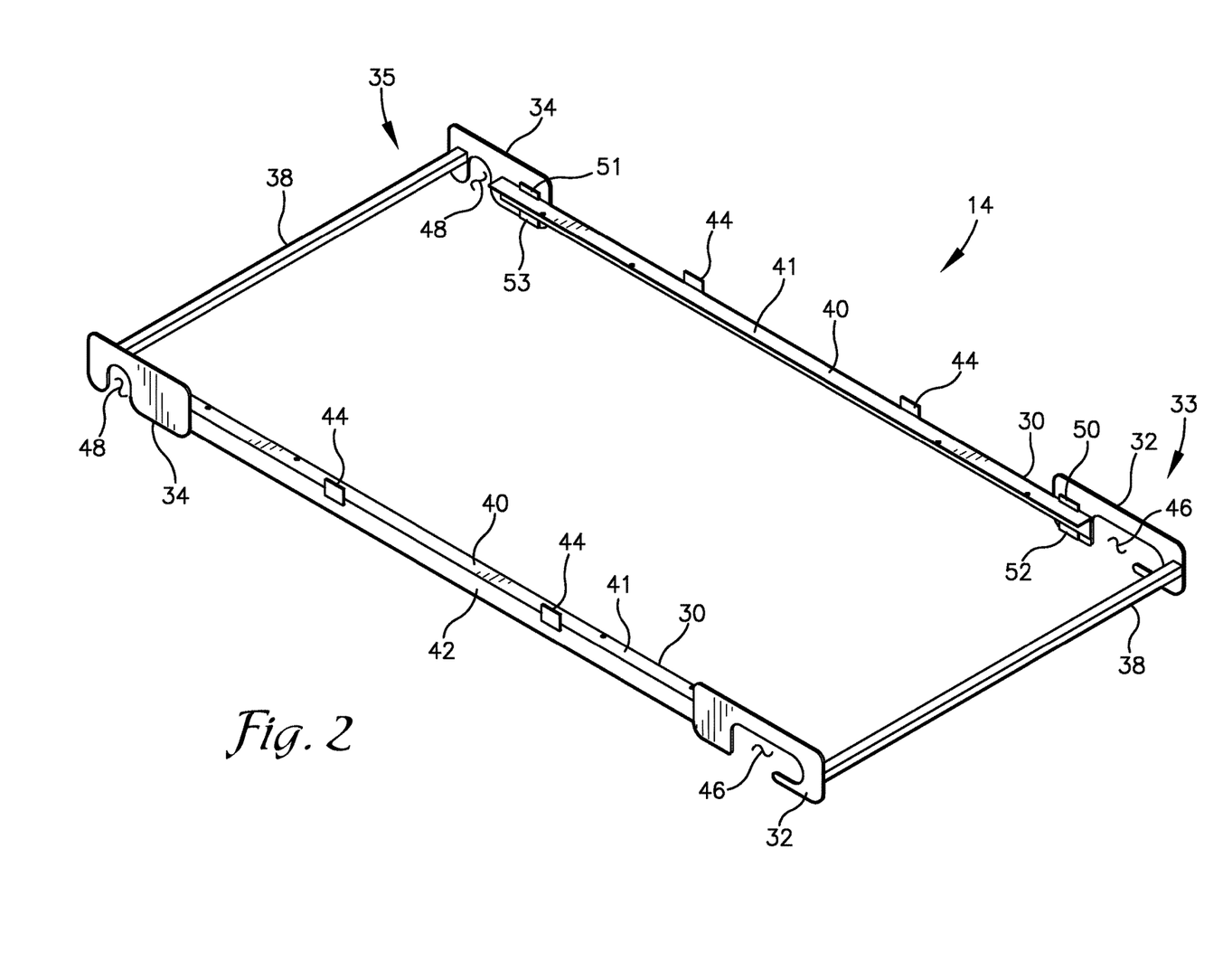
FIG. 2 is a perspective view of a frame of a solar panel module depicted in accordance with an embodiment of the invention.
Figure 3:
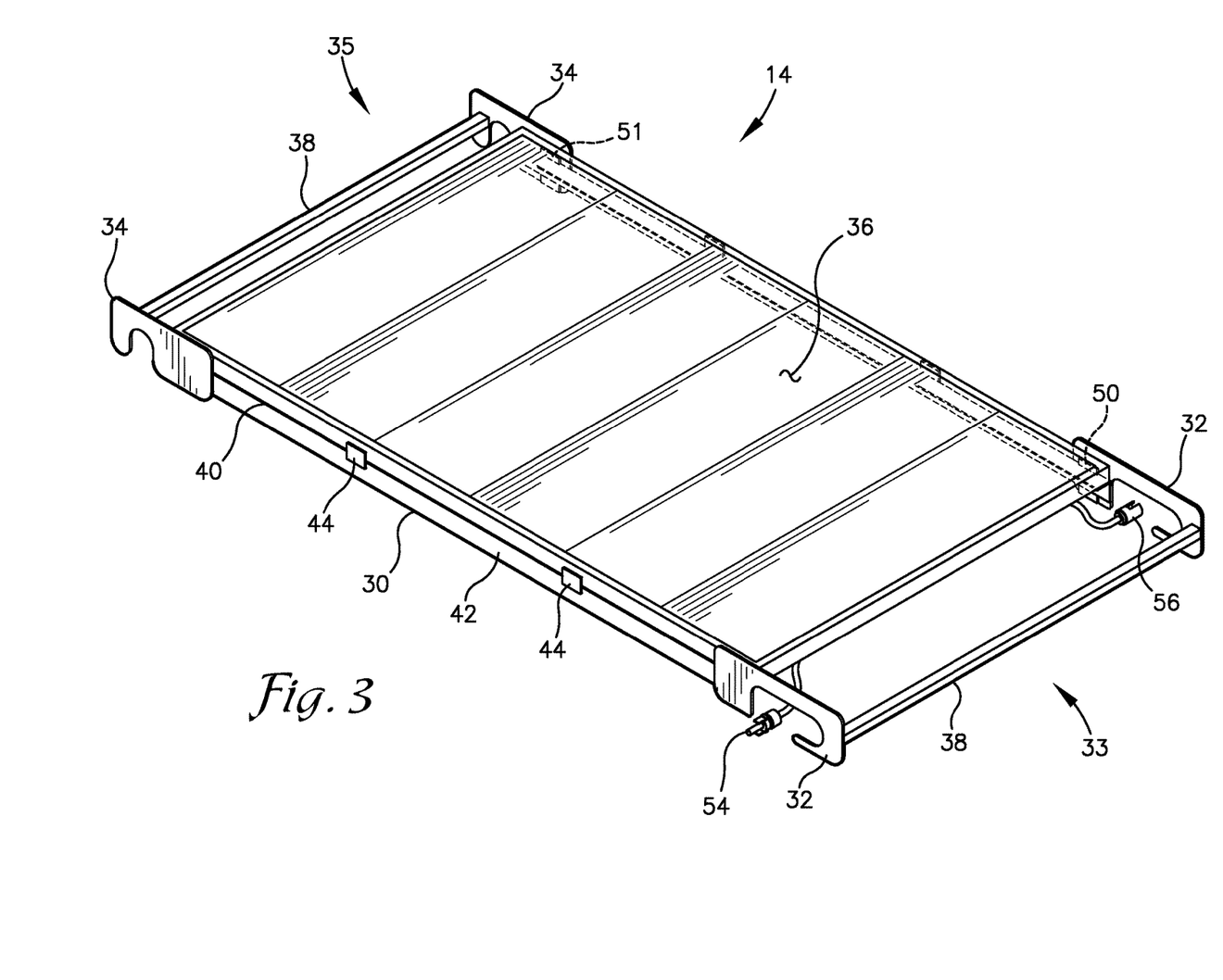
FIG. 3 is a perspective view of a solar panel module depicted in accordance with an embodiment of the invention.

With continued reference to FIGS. 2-3, each of the solar panel modules 14 includes a pair of spaced apart side members 30. The side members 30 each include a hooked flange 32 at a first end 33 and a slotted flange 34 at an opposite second end 35 thereof. The hooked and slotted flanges 32, 34 are preferably coupled to respective ends of the side members 30 or may be integral therewith as shown in FIGS. 5-8 and described more fully below. One or more solar panels 36 are disposed on and extending between the side members 30. A cross-bar 38 is provided at the first end 33 of the module 14 coupled between the hooked flanges 32 and at the second end 35 between the slotted flanges 34. The cross-bar 38 is fastened or bonded, such as by using one or more fasteners or by welding to the respective flanges 32, 34 and is positioned generally longitudinally in line with the side members 30.

Figure 4:
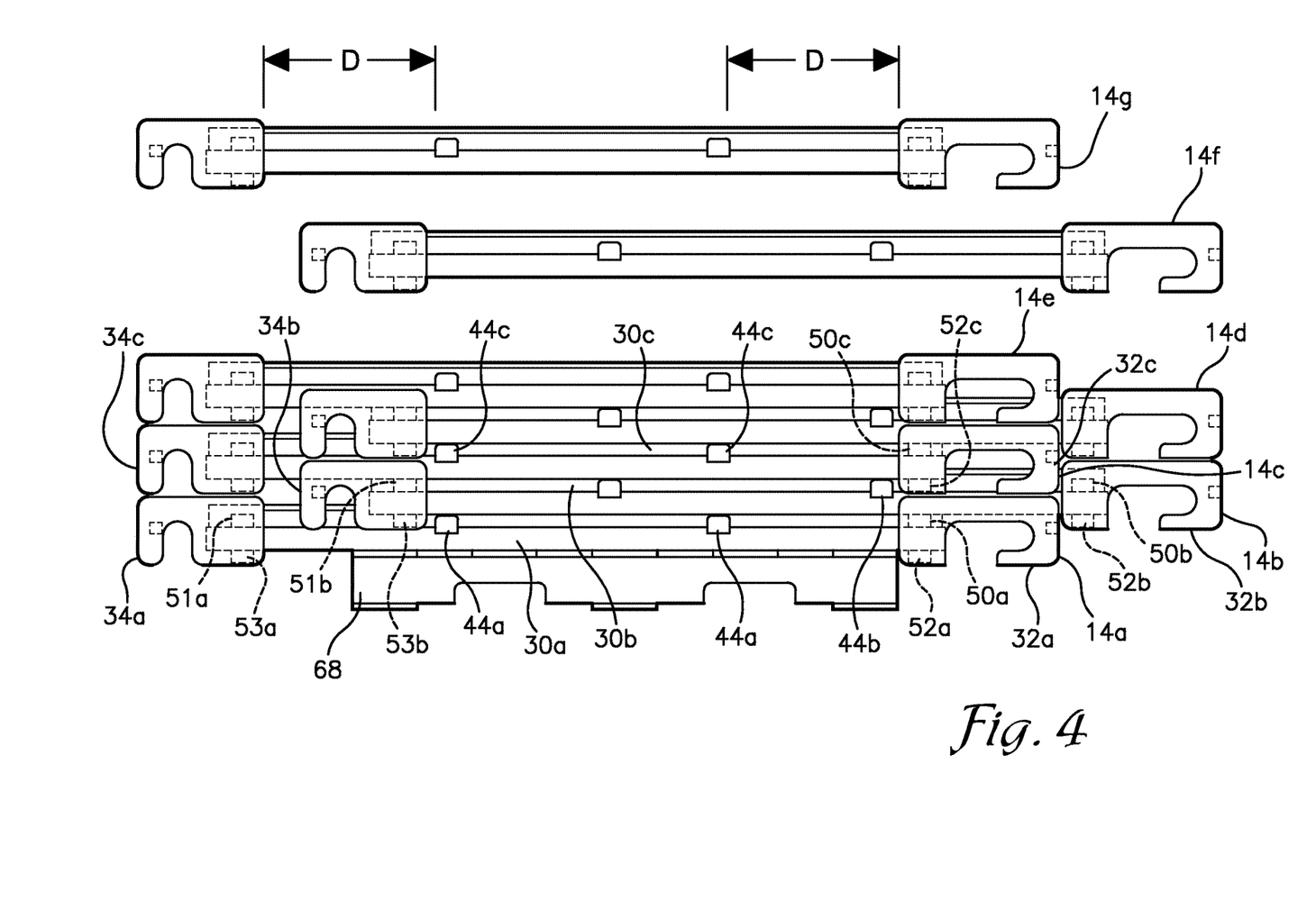
FIG. 4 is a side elevational view of a plurality of the solar panel modules of FIG. 3 in a stacked orientation depicted in accordance with an embodiment of the invention.

Each side member 30 may be formed from structural member such as an angle or L-shaped member that includes a inwardly directed flange 40 extending in the plane of the solar panel module 14 and provides a surface or mounting face 41 upon which the solar panels 36 are disposed and a side flange 42 extending generally perpendicularly and downwardly away from a bottom side of the module 14. Two anti-shift blocks 44 are disposed along the length of the side member 30 extending a distance vertically upward therefrom. The anti-shift block 44 nearest the first end 33 of the module 14 is spaced inwardly away from the hooked flange 32 a distance (D) equal to or just larger than the length of the hooked flange 32, as depicted in FIG. 4. The anti-shift block 44 nearest the second end 35 of the module 14 is spaced inwardly apart from the slotted flange 34 the distance D.

The hooked flange 32 and the slotted flange 34 are coupled to the side flange 42 of the side members 30 at their respective ends to lie parallel to the side flanges 42. The hooked flange 32 extends from the side member 30 toward the first end 33 of the module 14 in a hooked or c-shaped configuration to provide an elongate slot 46 that is enclosed at a distal end and open to a bottom edge of the flange 32 proximate the side member 30. The slot 46 and the opening thereto have dimensions suitable to receive the cross-section of the longitudinal support 18a of the support structure therein. The slot 46 extends longitudinally relative to the side member 30 to which it is attached.

The slotted flange 34 extends from the opposite end of the side member 30 toward the second end 35 of the module 14. The slotted flange 34 includes a recess 48 extending vertically upward into the flange 34 from a bottom edge thereof and generally transverse to the side member 30 to which it is attached. The recess 48 is dimensioned to receive the cross-section of the longitudinal support 18b of the support structure 12 therein. The hooked flange 32 and the slotted flange 34 are equal in height, which is greater than the vertical thickness of the combined solar panel 36 and side members 30.

Upper and lower support tabs 50, 52 extending upwardly and downwardly, respectively, from the side flange 42 of each side member 30 are provided in association with the hooked flange 32. Upper and lower support tabs 51, 53 are similarly provided in association with the slotted flange 34. The upper support tabs 50, 51 extend a distance that is less than the height of the flanges 32 and 34 and are configured to receive a bottom edge of the side flange 42 of another solar panel module 14 that is stacked thereon. The lower support tabs 52, 53 extend downwardly a distance generally equal to that of the flanges 32 and 34 and are configured to engage a top surface of the side member 30 of an underlying solar panel module 14 when in a stacked orientation.

The solar panels 36 are of an available design and configuration. The solar panels 36 may comprise a single panel or a plurality of panels that are electrically coupled. The solar panels 36 can further be configured to provide a desired level of electrical output based on available technology, available solar radiation, and/or intended usage of the electrical output. Cost effective solar panels 36 are currently available which can each generate up to about 240-300 watts of electrical energy.

Each of the solar panels 36 includes a male and a female connector 54, 56 extending therefrom. The connectors 54, 56 may extend from the solar panels 36 in any desired configuration. As depicted in FIG. 3, the male connector 54 extends from the solar panel 36 adjacent a first side of the solar panel module 14 while the female connector 56 extends from adjacent an opposite second side. As such, when placed side-by-side on the support structure 12, the solar panels 36 of the solar panel modules 14 can be electrically coupled together and to the power pack 16 via a single circuit. An extension cord 58 or other electrical coupling means may be provided to extend from one of the solar panel modules 14 to the power pack 16. Alternatively, the solar panels 36 can be configured into a plurality of circuits or in a parallel circuit configuration as desired.

The power pack 16 includes conventional components such as one or more batteries 60 and a control module 62 configured to control charging of the batteries 60 and discharging the batteries 60 to provide electrical power to components coupled thereto. The power pack 16 may include one or more standard power receptacles for coupling to components to be provided with electricity or may enable hardwiring of such components thereto. The power pack 16 has a generally compact configuration and is on a base 64 that enables movement thereof by a hand-truck, dolly, fork-lift, or similar means.

With continued reference to FIGS. 1-4, operation of the solar array 10 is described in accordance with an embodiment of the invention. Initially, the support structure 12 is assembled by appropriately fastening the longitudinal supports 18a, 18b, cross-members 20 and legs 24 into the fixtures 26. One or more struts 66 might also be disposed on the support structure 12 to provide additional stability and/or strength. As depicted in FIG. 1, the support structure 12 is configured to provide the frame 22 in an elevated, overhead position. The support structure 12 might be assembled adjacent to an entry/exit to a temporary structure, like a tent, recreational vehicle, trailer, or over the top of a display booth, or other outdoor area. More than one support structure might also be employed side-by-side, end-to-end, or in another desired orientation.

The solar panel modules 14 are transported to the location of the support structure 12. The solar panel modules 14 are configured to enable stacking thereof and thus may be transported in a stacked orientation, such as on a pallet 68 as depicted in FIG. 4. Stacking of the modules 14 on the pallet 68 enables movement thereof using a hand-truck, dolly, forklift, or similar means. The modules 14 are preferably configured for stacking up to ten high but greater or lesser numbers of the modules 14 might be stacked as desired.

In the stacked orientation, each vertically adjacent solar panel module 14 is offset toward the first or second ends 33, 35. A first module 14a is disposed on the pallet 68 such that the pallet 68 lies between the hooked flange 32 and the slotted flange 34 and the side members 30 of the first module 14a rest on top of the pallet 68. Or the hooked and slotted flanges 32, 34 may support the first module 14a on the pallet 68.

A second module 14b is disposed on top of the first module 14a such that the hooked flange 32a of the first module 14a is positioned between the hooked flange 32b and the adjacent anti-shift block 44b of the second module 14b. The second module 14b is thus supported by the upper support tab 50a of the first module 14a engaging the side member 30b of the second module 14b and by the lower support tab 53b of the second module 14b engaging the side member 30a of the first module 14a. The second module 14b is also prevented from moving or sliding toward its first end 33 thereof by interaction between the slotted flange 34b and the anti-shift block 44a nearest the second end 35 of first module 14a and from moving or sliding toward its second end 35 by interaction between the hooked flanges 32a and 32b.

A third module 14c is vertically aligned with the first module 14a and is stacked on top of the second module 14. The third module 14c is thus supported by the hooked flange 32c and the slotted flange 34c resting atop the hooked flange 32a and the slotted flange 34a of the first module 14a respectively. The hooked flange 32c of the third module 14c is also disposed between the hooked flange 32b and the adjacent anti-shift block 44b of the second module 14b which prevents or obstructs sliding movement of the third module 14c toward its first or second ends 33, 35. Subsequent modules 14d-g are alternatingly positioned to similarly align with the appropriate underlying modules 14 as depicted in FIG. 4.

As such, support of the modules 14a-g in the stacked orientation is provided by the side members 30, flanges 32, 34, and upper and lower support tabs 50, 51, 52, 53. The solar panels 36 are thus protected from application of forces during stacking that might damage the panels 36.

With continued reference to FIG. 1, the solar panel modules 14 are disposed on the support structure 12 by engaging a first of the longitudinal supports 18a of the support structure 12 with the hooked flanges 32, as shown at "1" in FIG. 1. The module 14 is next moved toward the first longitudinal support 18a to slide the first longitudinal support 18a within the elongate slots 46 and away from the first end 33 of the module 14, as shown at "2." The module 14 is rotated in a first direction about the first longitudinal support 18a to move the second end 35 of the module 14 toward and above the second longitudinal support 18b, as depicted at "3." The module 14 is translated toward the second longitudinal support 18b to slide the first longitudinal support 18a toward the enclosed ends of the elongate slots 46 and to align the vertically extending recesses 48 in the slotted flanges 34 with the second longitudinal support 18b, as shown at "4." The module 14 is then rotated in a second direction, opposite the first direction, to engage the second longitudinal support 18b in the recesses 48 of the slotted flanges 34, as depicted at "5."

The module 14 is thus supported on the support structure 12 by the hooked and slotted flanges 32, 34 and is removeably locked thereon by the interaction of the hooked and slotted flanges 32, 34 with their respective longitudinal supports 18a, 18b. The slotted flanges 34 prevent translation movement of the module 14 in a direction toward the first or second ends 33, 35 thereof by engagement of the second longitudinal support 18b in the recesses 48. And the hooked flanges 32 prevent vertical movement of the first end 33 of the module 14 by engagement of the first longitudinal support 18a within the enclosed portion of the elongate slot 46 and cannot disengage therefrom without the module 14 first moving in a direction toward the first end 33—such movement being restricted by the slotted flanges 34. Additionally, one or more elastic bands 70, cords, ropes, clamps, or similar components might be coupled between the module 14 and the longitudinal supports 18a, 18b to further prevent removal or disengagement of the module 14 from the support structure 12.

Any number of the modules 14 can be disposed on the support structure 12 in a side-by-side fashion, as depicted in FIG. 1. The modules 14 can be slideably moved along the longitudinal supports 18a, 18b to abut one another and to place the modules 14 in close proximity to enable electrical coupling therebetween. The solar panel 36 of each module 14 is electrically coupled to the solar panel 36 of the adjacent modules 14 via the corresponding male and female connectors 54, 56. The male and female connectors 54, 56 may be manually coupled or the connectors 54, 56 may be configured to automatically mate when the modules 14 are pushed into side-by-side contact.

A male or female connector 54, 56 at a terminal end of the group of electrically coupled modules 14 is employed to couple to the extension cord 58 extending from the power pack 16. The power pack 16 may be disposed adjacent the support structure 12 or at another desired location. Components to be provided with electricity can be coupled to the power pack 16 by known means.

With additional reference now to FIGS. 5-8, a solar panel module 114 is described in accordance with another embodiment of the invention. The solar panel module 114 includes many features similar to those of the solar panel module 14 described above. Similar elements in the various embodiments depicted are provided with reference numerals having matching second and third digits but with differing first digits, e.g. element 10 is similar to elements 110, 210, etc. Such is provided to avoid redundant description of similar features of the elements but is not intended to indicate the features or elements are necessarily the same.

The solar panel module 114 is configured to enable nested, vertical stacking of a plurality of the modules 114 without longitudinally offsetting the modules 114 relative to one another. The hooked flanges 132 and slotted flanges 134 are preferably integral with the side members 130 and form a continuous component extending the length of the module 114. Cross-bars 138 may be provided extending between respective ends of each of the side members 130.

Figure 6:
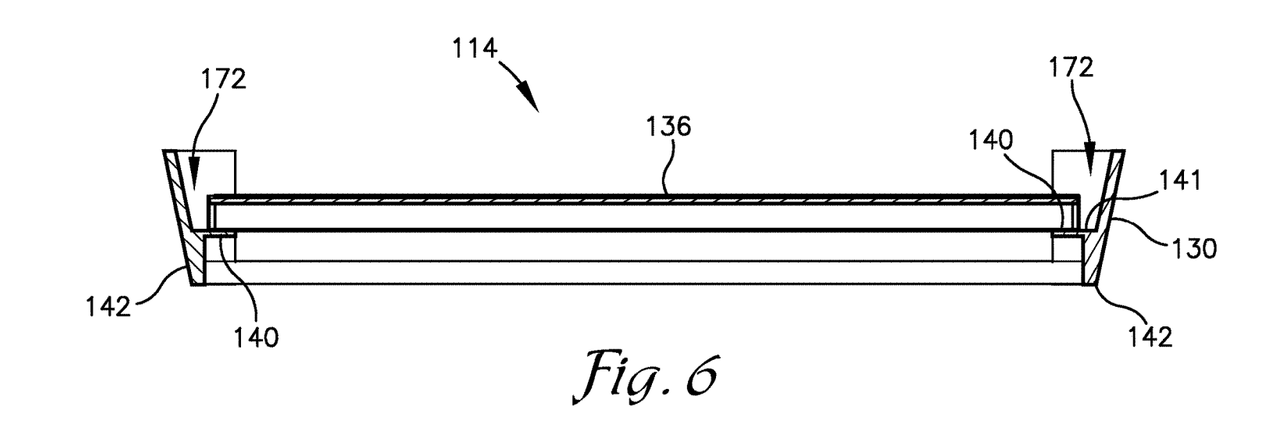
FIG. 6 is a cross-sectional view of a solar panel module of FIG. 5 taken along the line A-A.
Figure 7:
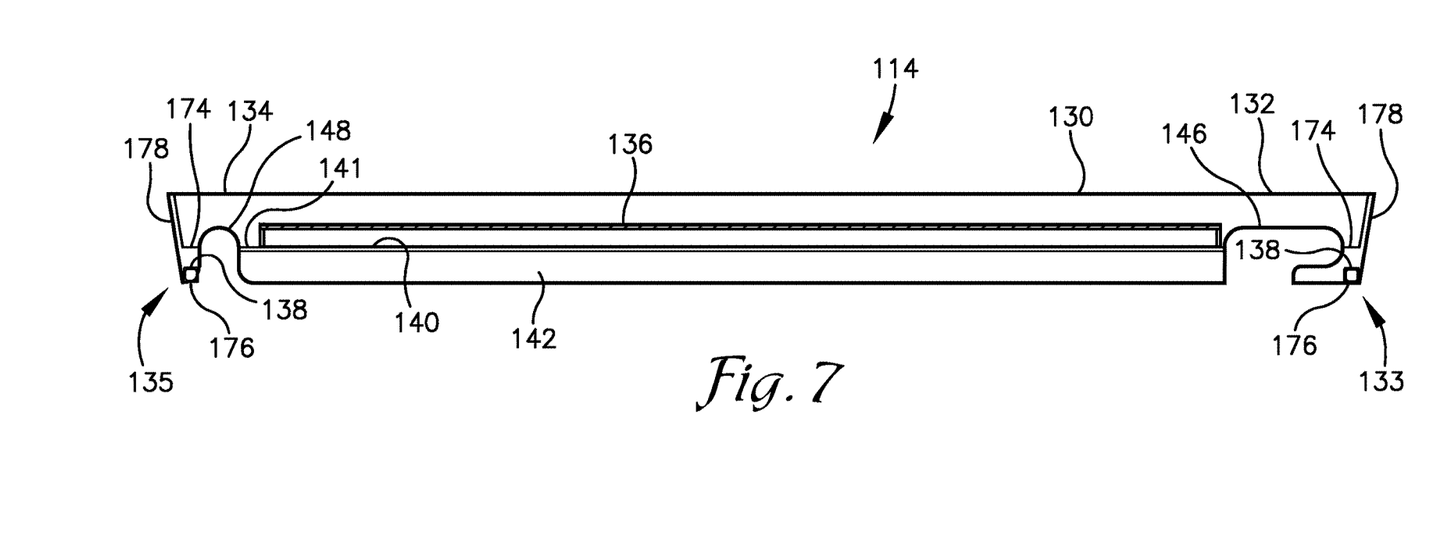
FIG. 7 is a cross sectional view of a solar panel module of FIG. 5 taken along the line B-B.

The side members 130 are canted or disposed at an angle such that top edges of the side members 130 lean at least partially outwardly and away from one another and lower edges thereof are directed at least partially inwardly and toward one another as depicted in FIG. 6. As shown in FIG. 7, the first and second ends 133 and 135 of the side members 130 angle inward from top to bottom to provide an orientation similar to that of the side members 130. The angle of the first and second ends 133, 135 may be the same or different than that of the side members 130. The angle of the side members 130 and the first and second ends 133, 135 is preferably between about 5° and about 20° from vertical, or more preferably between about 7° and about 15°, or about 12°. The terms "about" or "approximately" as used herein denote deviations from the exact value by +/−10%, preferably by +/−5% and/or deviations in the form of changes that are insignificant to the function. Accordingly, the perimeter of the solar panel module 114 formed by the side members 130 and the first and second ends 133, 135 thereof is provided with an inverted, truncated pyramidal form.

With continued reference to FIG. 6, the side members 130 include a side flange 142 and an inwardly directed flange 140 similar to that of the module 14 described previously. The side flange 142 is formed by a bottom edge of the side member 130 and extends longitudinally substantially the length of the side member 130. The inwardly directed flange 140 projects inward from an interior face of the side member 130 and in a direction substantially perpendicular to vertical or toward the opposite side member 130. The inwardly directed flange 140 provides a mounting location or mounting face 141 on which the solar panel 136 is disposed. A space or trough 172 is formed between the longitudinal edge of the solar panel 136 and the interior face of the side member 130; the mounting face 141 of the inwardly directed flange 140 forms a third, bottom side of the trough 172. The trough 172 is substantially vertically aligned with a bottom edge of the side flange 142 and is dimensioned to receive the bottom edge of the side flange 142 of another solar panel module 114 stacked vertically on top of the module 114. The overlying solar panel module 114 can thus be at least partially supported on the inwardly directed flanges 140 of the underlying module 114.

The inwardly directed flange 140 may extend continuously along the length of the side member 130 between the elongate slot 146 of the hooked flange 132 and the recess 148 of the slotted flange 134 or along substantially the length of the solar panel 136 mounted thereon. The inwardly directed flange 140 might alternatively be segmented and only provided at various desired locations along the side members 130. A ledge 174 may be provided at one or more of the first and second ends 133, 135 of the module 114 on distal sides of the elongate slots 146 and the recesses 148 to operatively extend the inwardly directed flanges 140 to the first and second ends 133, 135 of the module 114. The ledges 174 are configured to receive a support face 176 of an overlying module 114 provided by the bottom edge the side members 130 or the side flanges 142 thereof at their first and second ends 133, 135.

Figure 5:
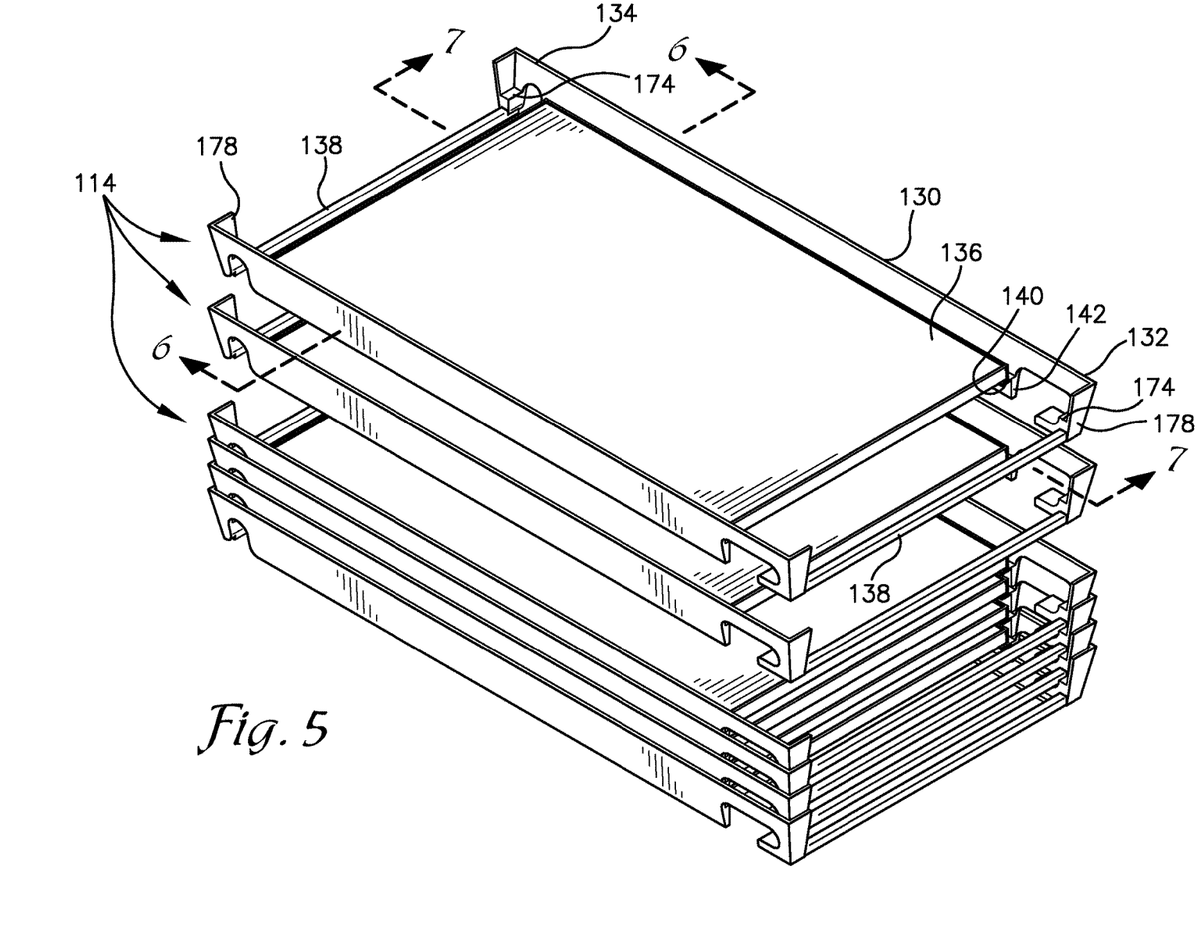
FIG. 5 is a perspective view of a plurality of vertically stacked solar panel modules depicted in accordance with another embodiment of the invention.
Figure 8:
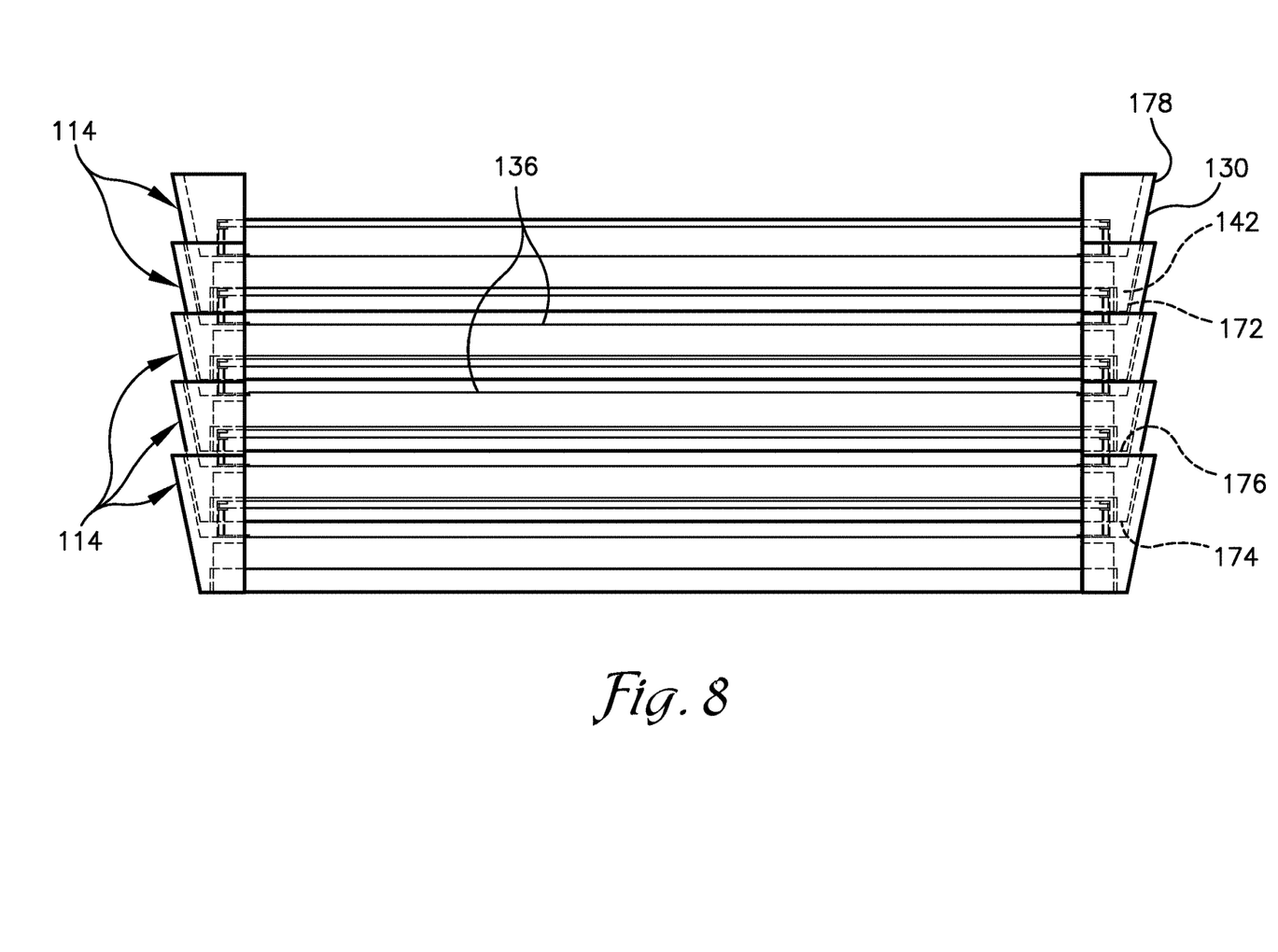
FIG. 8 is an end elevational view of the vertically stacked solar panel modules of FIG. 5 with hidden features depicted in phantom lines.

Accordingly, the solar panel modules 114 may be stacked vertically in an at least partially nested configuration as shown in FIGS. 5 and 8. When stacked, the canted orientation of the side members 130 enables the side flange 142 of an overlying module 114 to be received between the side members 130 of the underlying module 114. The side flanges 142 are further received within the troughs 172 of the underlying module 114 and are supported on the inwardly directed flanges 140 thereof. The first and second ends 133, 135 of the overlying module 114 are received between end plates 178 that may be provided at each of the first and second ends 133, 135 of the modules 114 and the support faces 176 of the overlying module 114 are supported on the respective ledges 174 of the underlying module 114. The overlying module 114 is thus supported vertically by the side members 130 of the underlying module 114. Relative horizontal movements between the overlying and underlying modules 114 are restricted in the longitudinal direction by the side members 130 and in the transverse direction by the end plates 178 of the underlying module 114. Additionally, as depicted in FIG. 8, the side flanges 142 are of sufficient vertical length to engage the troughs 172 of an underlying module 114 without the inwardly directed flanges 140 or the solar panel 136 of the overlying module 114 contacting the solar panel 136 of the underlying module 114.

Deployment of the solar panel modules 114 on the support structure 12 is completed in a similar manner to that described previously above with respect to the modules 14. The deployment of the modules 114 is thus not described again here.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A modular solar panel assembly comprising:
   a pair of parallel, spaced apart, longitudinally extending frame members each including a mounting flange extending toward the opposite frame member in a common transverse plane and a side flange extending at an angle to the mounting flange, the mounting flange including a mounting face;
   a solar panel supported on the mounting faces and between the frame members;
   a pair of planar, hooked flanges disposed at respective first longitudinal ends of the frame members and extending longitudinally in a plane that is substantially parallel to the side flange of the frame members, the hooked flanges each including a first top edge and a first bottom edge and defining a hook-shaped cutout that extends through a transverse thickness of the hooked flange with a first portion that extends from the first bottom edge toward the first top edge into the hooked flange and a second portion that turns to extend toward a longitudinal end of the hooked flange in a direction generally parallel to the frame members, the first bottom edge of the hooked flange facing in an opposite direction to the mounting face; and
   a pair of planar, slotted flanges disposed at respective second longitudinal ends of the frame members and extending longitudinally from the second longitudinal ends in a direction opposite that of the hooked flanges and in the same plane as the hooked flange at the opposite end of the respective frame member, each of the slotted flanges including a slot that extends into the slotted flange from a second bottom edge of the slotted flange toward a second top edge, the second bottom edge being directed in the same direction as the first bottom edge of the hooked flanges.

2. The modular solar panel assembly of claim 1, wherein the hooked flanges and the slotted flanges on each respective longitudinal frame member are spaced in a transverse direction outwardly away from a respective side edge of the solar panel a distance equal to or greater than a thickness of the side flange of the longitudinal frame members.

3. The modular solar panel assembly of claim 2, further comprising:
an upper support tab disposed to extend perpendicularly away from the mounting face of the longitudinal frame members in a direction opposite that of the side flange and to contact and support another modular solar panel assembly having a substantially similar configuration and stacked on top of the modular solar panel assembly.

4. The modular solar panel assembly of claim 3, wherein the upper support tab is disposed on a transverse face of each hooked flange and each slotted flange in the space between the respective hooked flange or slotted flange and the respective side edge of the solar panel.

5. The modular solar panel assembly of claim 1, wherein the side flange one or more of extends to a position that is substantially flush with the second bottom edge of the slotted flanges or includes a support tab that operatively extends an edge of the side flange to the position that is substantially flush with the second bottom edge of the slotted flanges.

6. The modular solar panel assembly of claim 1, wherein a plurality of the modular solar panel assemblies are stackable vertically, each successive assembly in a stack being offset longitudinally a distance substantially equal to or greater than a longitudinal length of the hooked flanges.

7. The modular solar panel assembly of claim 1, further comprising:
an anti-shift tab disposed on at least one of the frame members at a location spaced apart from a respective one of the hooked flange or slotted flange a distance substantially equal to or greater than a longitudinal length of the respective hooked or slotted flange, the anti-shift tab being configured to obstruct relative longitudinal movement of a similarly configured modular solar panel assembly that is stacked on top of the modular solar panel assembly.

8. The modular solar panel assembly of claim 1, further comprising:
a support structure having at least a first support bar and a second support bar that is spaced apart and parallel to the first support bar,
wherein the hooked flanges of the modular solar panel assembly are engaged with the first support bar with the first support bar being positioned within the second portion of the hook-shaped opening, and
wherein the slotted flanges are engaged with the second support bar with the second support being positioned within the slots in the slotted flanges.

9. The modular solar panel assembly of claim 1, wherein the modular solar panel assembly is at least partially nestably vertically stackable on another similarly configured modular solar panel assembly.

10. A modular solar power generator assembly comprising:
a support structure including at least a first support bar and a second support bar that is parallel to and spaced apart from the first support bar in a longitudinal direction, the first and second support bars extending in a transverse direction;
a plurality of modular solar panel assemblies coupleable together in electrical communication, each assembly including
a pair of parallel, spaced apart longitudinal frame members each including a mounting flange that extends in the transverse direction toward the opposite frame member in a common plane, the mounting flange including a mounting face directed vertically upward in a first direction,
a solar panel supported on the mounting faces and between the frame members,
a pair of hooked flanges at respective first ends of the frame members, the hooked flanges being oriented in a vertically and longitudinally extending first plane and each including an L-shaped cutout that extends through a transverse thickness of the hooked flange and in which the first support bar is receivable, the hooked flange including a top edge facing in the first direction and a bottom edge facing in a second direction that is opposite the first direction, the L-shaped recess including a first portion extending from the bottom edge toward the top edge and a second portion extending at an angle to the first portion, and
a pair of slotted flanges at respective second ends of the frame members and oriented in the first plane, each slotted flange including a slot into which the second support bar is receivable via a bottom edge of the slotted flange; and
a power pack electrically coupleable with the plurality of solar panel assemblies and that includes a battery and a control unit, the battery storing energy provided by the modular solar panel assemblies, and the control unit managing the storing and provision of the energy to electrical components coupled thereto.

11. The modular solar power generator assembly of claim 10, wherein the solar panel assemblies are disposed on the support structure by engaging the first support bar in the first portion of the L-shaped recess of the hooked flanges, the first portion extending generally perpendicularly to the length of the hooked flanges, pivoting the solar panel assembly about the first support bar to position the slotted flanges above the second support bar, sliding the solar panel assembly toward and over the second support bar to move the first support bar into the second portion of the L-shaped recesses and to align the slots of the slotted flanges with the second support bar, and pivoting the solar panel assembly toward the second support bar to engage the second support bar in the slots.

12. The modular solar power generator assembly of claim 10, further comprising:
a strap or clamp configured to retain the solar panel assembly in a position in which the second support bar is engaged with the slots of the slotted flanges.

13. The modular solar power generator assembly of claim 10, wherein the plurality of solar panel assemblies are stackable.

14. The modular solar power generator assembly of claim 13, further comprising:
a flange on each of the longitudinal frame members that extends substantially the length of the frame member and generally perpendicular to the mounting face in the first plane or in a second plane that is parallel to the first plane;
an upper support tab disposed to extend away from the mounting face of the longitudinal frame members in a direction opposite that of the flange and in the first or second plane and to contact and support the flange of another modular solar panel assembly of the plurality stacked on top of the modular solar panel assembly.

15. The modular solar power generator assembly of claim 13, wherein the plurality of the modular solar panel assemblies are stacked vertically, each successive assembly in a stack being offset longitudinally a distance substantially equal to or greater than a longitudinal length of the hooked flanges.

16. A stackable solar panel assembly comprising:
a pair of parallel, spaced apart longitudinal frame members each including a horizontally extending mounting flange with an upwardly facing mounting face and a substantially vertically extending support flange extending at a downward angle relative to the mounting face;
a solar panel supported on the mounting faces and between the frame members, a perimeter of the solar panel being spaced transversely apart from an outer edge of the mounting face of the longitudinal frame members a distance equal to or greater than a thickness of the support flanges;
a pair of planar, hooked, first flanges at respective first ends of the frame members and oriented in respective first planes that extend in a first longitudinal direction from the first ends and in a substantially vertical direction, the first flanges each including a first top edge and a first bottom edge and defining a hook-shaped cutout that extends through a transverse thickness of the first flange with a first portion that extends from the first bottom edge toward the first top edge into the first flange and a second portion that turns to extend toward a longitudinal end of the first flange in a direction generally parallel to the frame members, the first bottom edge of the first flange facing in an opposite direction to the mounting face;
a pair of planar, slotted, second flanges at respective second ends of the frame members and oriented in the respective first planes to extend in a second longitudinal direction from the second ends, the second longitudinal direction being opposite the first longitudinal direction, each of the second flanges including a slot that extends into the second flange from a second bottom edge of the second flange toward a second top edge, the second bottom edge being directed in the same direction as the first bottom edge of the first flange; and
a plurality of upper support tabs disposed to extend upwardly away from the mounting face of the longitudinal frame members in a direction opposite that of the support flange and in substantial vertical alignment with a bottom edge of the support flange, the first flanges, the second flanges, the support flanges, and the upper support tabs supporting the solar panel assembly in a stacked orientation with one or more similarly configured solar panel assemblies from a location entirely outside of a perimeter of the solar panel with no vertical load applied on the solar panel.

17. The stackable solar panel assembly of claim 16, wherein a first solar panel assembly is disposed on a support surface, and wherein a second solar panel assembly is stacked thereon, the second solar panel assembly being longitudinally offset a distance equal to or greater than a longitudinal length of the first flanges, and the second solar panel assembly being supported above the first solar panel assembly by contact with the longitudinal frame members of the first solar panel and by contact between one or more of the upper support tabs on the first solar panel assembly with the distal edge of the support flange of the second solar panel assembly.

18. The stackable solar panel assembly of claim 17, wherein the contact between the second solar panel assembly and the longitudinal frame members of the first solar panel assembly is between the edges of the support flanges and the frame members or between one or more lower support tabs and the frame members, the lower support tabs operatively extending at least a portion of the edge of the support flange to a position that is substantially flush with the first and second bottom edges of the first and second flanges respectively.

19. The stackable solar panel assembly of claim 18, further comprising:
a third solar panel assembly stacked on top of the second solar panel assembly, the third solar panel assembly being substantially vertically aligned with the first solar panel assembly and being supported by contact between the first flanges of the first solar panel assembly and the third solar panel assembly and contact between the second flanges of the first solar panel assembly and the third solar panel assembly.

20. The stackable solar panel assembly of claim 16, wherein the solar panel assembly comprises a first solar panel assembly, and wherein longitudinal frame members of a second solar panel assembly that is stacked on top of the first solar panel assembly lie between the first flanges and between the second flanges to restrain the second solar panel assembly against relative transverse movement.

21. The stackable solar panel assembly of claim 16, wherein the stackable solar panel comprises a first panel, wherein a second panel is stacked on top of the first panel, and further comprising:
an anti-shift tab disposed on at least one of the frame members of the first panel at a location spaced longitudinally apart from the first flange thereof a distance substantially equal to or greater than a longitudinal length of the first flange, the first flange of the second panel being disposed between the anti-shift tab and the first flange of the first panel, the anti-shift tab and the first flange of the first panel obstructing relative longitudinal movement of the second panel.

22. A modular solar panel assembly comprising:
a first and a second assembly unit, the first assembly unit being stacked vertically on the second assembly unit, each of the first and second assembly units including:
a pair of parallel, spaced apart longitudinal frame members each including a mounting flange extending transversely in a common horizontal plane toward the opposite frame member and having a mounting face that is directed in a first vertical direction, and a side flange extending in a second vertical direction that is generally opposite the first direction and terminating at a distal edge, each longitudinal frame member further including a hooked first mounting portion oriented within a vertically and longitudinally extending plane and that includes a generally L-shaped first slot extending transversely through the plane, and a slotted second mounting portion disposed at an end of the longitudinal frame member opposite the first mounting portion and oriented within the plane, the second mounting portion forming a second slot that extends through the plane and vertically upward into the second mounting portion from a bottom edge;

a solar panel supported on the mounting faces and between the frame members, at least a portion of the mounting face of each frame member extending transversely beyond lateral edges of the solar panel to provide an abutment face that is vertically aligned with the distal edge of the side flange of the respective frame member; and a trough formed along each lateral edge of the solar panel at least in part by the lateral edge of the solar panel and the abutment face, wherein, the trough of the second assembly unit includes dimensions sufficient to receive the distal edge of the side flange of the overlying first assembly unit on the abutment face, and wherein the first assembly unit is supported on and by the second assembly unit from entirely outside of a perimeter of the solar panel of the second assembly unit and the solar panel of the second assembly unit receives no vertical loading forces from the overlying first assembly unit.

* * * * *